United States Patent [19]

Su

[11] Patent Number: 4,996,466

[45] Date of Patent: Feb. 26, 1991

[54] CIRCUIT FOR CONTROLLING A TAPE TENSION DURING SEARCH MODE

[75] Inventor: Hyun-Joon Su, Seoul, Rep. of Korea

[73] Assignee: SamSung Electronics, Ltd., Suweon, Rep. of Korea

[21] Appl. No.: 292,105

[22] Filed: Dec. 30, 1988

[30] Foreign Application Priority Data

May 18, 1988 [KR] Rep. of Korea .................. 1988-7366

[51] Int. Cl.$^5$ ........................................... B65H 59/38
[52] U.S. Cl. ........................................... 318/6; 318/7
[58] Field of Search .................. 318/6, 7, 362; 360/73.01, 73.06, 73.08, 73.09, 73.11, 73.12, 74.2, 74.3

[56] References Cited

U.S. PATENT DOCUMENTS

| 4,126,817 | 11/1978 | Luzio | 318/7 |
| 4,156,257 | 5/1979 | Roberts | 360/73.12 X |
| 4,160,195 | 7/1979 | Sakamoto | 318/7 |
| 4,540,920 | 9/1985 | Cutler et al. | 318/7 |
| 4,777,413 | 10/1988 | Yoshimura et al. | 318/7 |
| 4,788,606 | 11/1988 | Uchikoshi | 318/7 X |

Primary Examiner—Bentsu Ro
Attorney, Agent, or Firm—Robert E. Bushnell

[57] ABSTRACT

A tape-tension control circuit for preventing an overvoltage from being applied by a phase locked loop (PPL) to drive a reel motor for use in a video recording-/reproducing apparatus upon selection of an initial search operation. First multiplexer 10 outputs selectively a frequency signal according to the rotation of a take-up reel or a supply reel thereof. Control circuit 20 synthesizes the output of the first multiplexor with a bias voltage to drive the reel motor at the least speed. Second multiplexor 50 receives at each input the synthesized output of the control circuit 20, and the phase-locked-loop output of the first multiplexor 10. The second multiplexor 50 consequently outputs control signals to control the operation of motor driver coupled to a reel motor. Comparator 40 compares the synthesized output of the control circuit 20 with a specified reference voltage, thereby controlling the multiplexing operation of the second multiplexor 50.

23 Claims, 2 Drawing Sheets

CIRCUIT FOR CONTROLLING A TAPE TENSION DURING SEARCH MODE

TECHNICAL FIELD

The present invention relates to a circuit for driving a reel motor upon a search mode, and more particularly, to a tape-tension control circuit for preventing application of overvoltage to the reel motor by a PLL (phase locked loop) upon the initial search.

BACKGROUND ART

FIG. 1 shows schematically a conventional circuit, where FGT indicates a frequency generating signal dependent on the rotation of a reel for taking up, and FGS indicates a frequency generating signal dependent on the rotation of a supply reel.

A multiplexor 6 outputs the FGT signal if the forward "HIGH" signal is selected from a microcomputer and outputs the FGS signal if the reverse "LOW" signal is selected therefrom. Also the signals selected in the multiplexor are applied through a phase locked loop (PLL) 7 to a reel motor, so that the reel motor via a motor driver 8 is driven by said signal.

However, in the conventional reel motor drive circuit as the above-mentioned, if the frequency generating signal is not generated upon the initial search mode, a d.c. voltage is directly applied from the multiplexor to rise the voltage in the phase locked loop up to the maximum voltage, so that said maximum voltage is applied to the motor driver 8 to thereby drive abruptly the reel motor. Therefore, there has been a problem in which excessive tension is applied to the tape.

SUMMARY OF THE INVENTION

It is therefore an object of the present invention to provide a circuit for controlling a tape tension through an initial control of the drive of a reel motor by a predetermined voltage and a bias voltage, to thereby prevent the application of excessive tension to a tape.

These and other objects are attained with a tape-tension circuit for preventing an over-voltage from being applied by a phase locked loop to drive a reel motor for use in a video recording/reproducing apparatus upon selection of an initial search operation. A first multiplexor outputs selectively a frequency signal according to the rotation of a take-up reel or a supply reel thereof. A control circuit synthesizes the output of the first multiplexor with a bias voltage to drive the reel motor at the least speed. A second multiplexor receives at each input the synthesized output of the control and the phase-locked-loop output of the first multiplexor. The second multiplexor consequently outputs control signals to control the operation of motor driver coupled to a reel motor. A comparator compares the synthesized output of the control with a specified reference voltage, thereby controlling the multiplexing operation of the second multiplexor.

The foregoing and other objects and of the invention will be better understood from the following more detailed description and appended claims.

DESCRIPTION OF THE PREFERRED EMBODIMENTS

An embodiment of the present invention will now be described hereinbelow with reference to the drawings.

Figure 1:
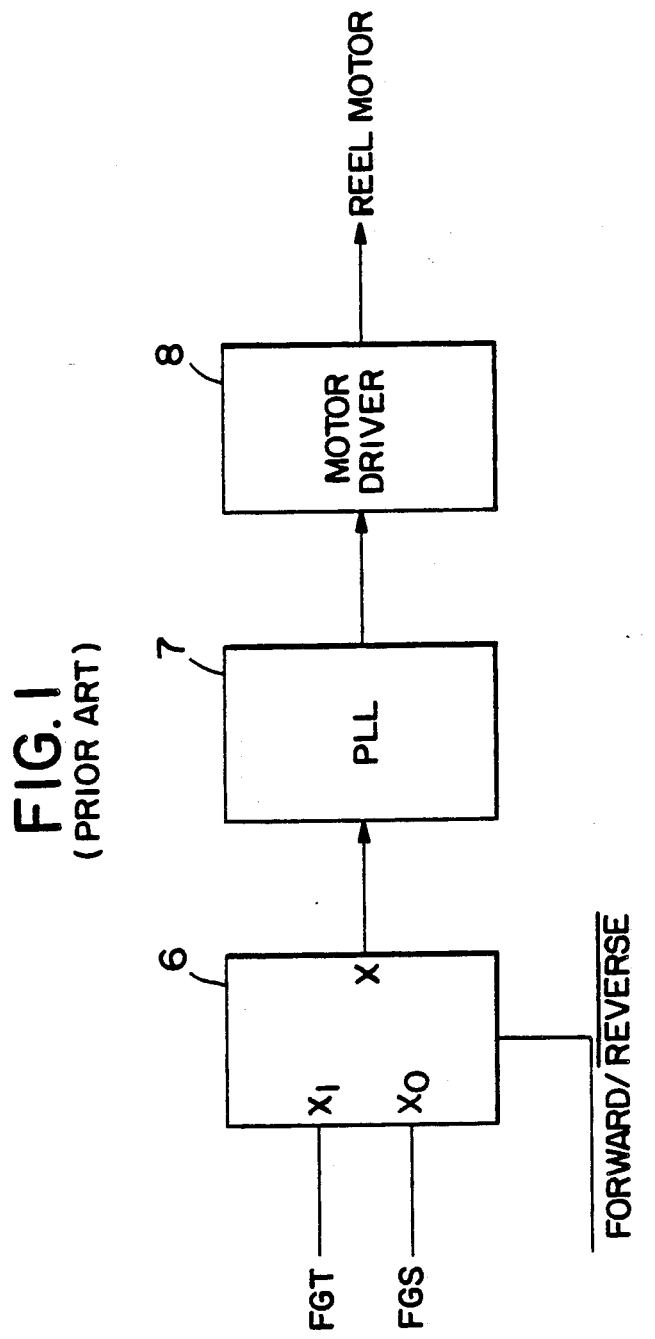
FIG. 1 is a diagram showing a conventional circuit.
Figure 2:
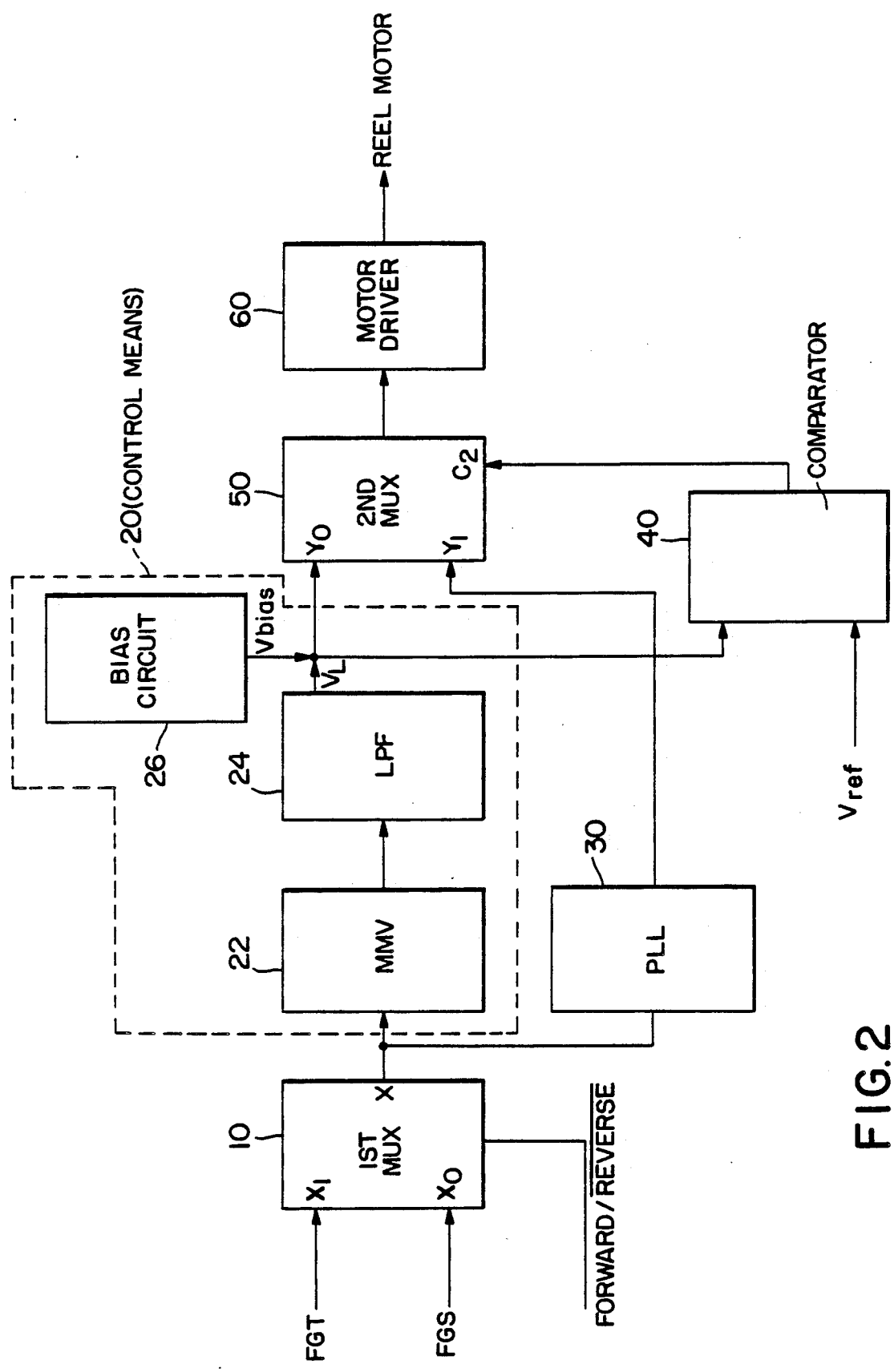
FIG. 2 is a diagram showing a circuit for conrolling a tape tension according to the present invention.

FIG. 2 shows a circuit according to the present invention, which includes a first multiplexor (10) for outputting a frequency generating (FGT) signal dependent on the rotation of a take-up reel if the forward signal is selected from a microcomputer and for outputting a frequency generating (FGS) signal dependent on the rotation of a supply reel if the reverse signal is selected therefrom; a control circuit (20) which includes a monostable multivibrator (MMV) (22), a low-pass filter (LPF) (24) and a bias circuit (26) generating a bias voltage (Vbias) which is the minimum voltage capable of driving a reel motor. The control circuit 20 synthesizing the d.c. voltage (VL) generated after the output from first multiplexor (10) is converted into the d.c. output and the bias voltage (Vbias) and provides the synthesized voltage; a phase locked loop PLL (30) phase-locks the output signal from said first multiplexor (10) to reverse the drive voltage of the reel motor; a comparator (40) compares the synthetic signal generated in the control circuit with the predetermined reference voltage (Vref), outputting the compared result; a second multiplexor (50) selectively provides the output of said control circuit (20) or said phase locked loop (30) according to the output from said comparator (40); and a motor driver (60) for driving the reel motor by the output applied from said second multiplexor (50).

The present invention will be explained in detail with reference to FIG. 2 based on the above-mentioned construction.

In FIG. 2, FGT indicates a frequency generating signal dependent on the rotation of a take-upn reel, and FGS indicates a frequency generating signal dependent on the rotation of a supply reel. The first multiplexor (10) outputs the FGT signal received through X1 terminal if the forward "HIGH" signal is selected from the microcomputer and outputs the FGS signal received through X0 terminal if the reverse "LOW" signal is selected therefrom. This time the network is assumed to be in a state in which reel motor does not rotate upon the initial search mode. Therefore, a frequency generating (FG) signal is not generated, so that the d.c. signal is outputted through the X terminal of said first multiplexor (10).

If the output from said first multiplexor (10) is applied through the monostable multivibrator (MMV) and the phase locked loop (30) to the motor driver, it is raised to the maximum, so that excessive tension is applied to the tape. Accordingly, in the initial search mode, the drive voltage is controlled to be applied to the motor as is described hereinbelow.

Above all, in the initial search mode, the FG signal through said first multiplexor (10) makes the pulse of the predetermined duty cycle generated through the monostable multivibrator (MMV) which, thereafter is converted through the low-pass filter (LPF) into the d.c. voltage. The d.c. voltage (VL) generated thus approximates "0" V. Therefore, the minimum voltage capable of rotating the reel motor must be supplied from the outside, so that it is performed in the bias circuit. That is, in the initial search mode, the d.c. voltage (VL) through the low-pass filter (LPF) and the bias voltage (Vbias) are synthesized to drive the reel motor.

At this time, if said bias voltage (Vbias) is set lower than the reference voltage (Vref) of the comparator (40), upon the intial search mode the comparator (40) generates the first control signal which is a "LOW" signal. If the first control signal of the comparator (40) is applied to the selection terminal (C2) of the second multiplexor (50), the second multiplexor (50) selects and outputs the synthesized signal (ST) received through the YO terminal, so that the motor driver (60) starts to drive the reel motor by the synthesized signal (ST). Then, if the frequency generating signal becomes large in accordance with the rotation of the reel motor, the d.c. voltage (VL) through the low-pass filter is increased, so that the predetermined signal is outputted through the YO terminal of the second multiplexor (50) until the equation [1] described hereinafter has been satisfied, thereby to slowly drive the reel motor.

$$Vref = Vbias + VL \quad [1]$$

where Vref represents the reference voltage of the comparator (40), Vbias represents the minimum voltage capable of driving the reel and VL represents the d.c. voltage through the low-pass filter.

At this time, if the following equation [2] is obtained, the rotation of the reel motor is driven at normal speed, so that the synthesized voltage is larger than said reference voltage (Vref). Accordingly, the comparator (40) outputs the second control signal as a "HIGH" signal.

Also, by said signal the second multiplexor (50) selects the signal through the phase locked loop (30).

$$Vref < Vbias + VL \quad [2]$$

Accordingly, upon the normal search mode, the stable output signal through phase locked loop (30) is applied through the Y1 terminal of the second multiplexor (50) to the motor driver (60), thereby driving the reel motor at high speed.

As has been described in the foregoing, in a image processing system such as the DAT (Digital Audio Tape) recorder and the VTR (Video Tape Recorder), upon the initial search mode the excessive tension applied to the tape can be removed. Therefore, there are advantages in which the damage of the tape can be prevented, the search operation can be performed smoothly, and the reliability and the life of the product can be increased.

It will be apparent that many modifications and variations may be effected without departing from the scope of the novel concepts of the present invention.

What is claimed is:

1. A circuit for controlling a tape tension upon a search mode in a reel motor driving circuit which drives a reel motor in the search mode by receiving frequency generating signals according to a rotation of a take-up and a supply reel, said circuit comprising:
   first multiplexor means for selectively outputting a frequency generating signal depending on the rotation of the take-up reel or the supply reel selected respectively by a forward signal or a reverse signal;
   control means for synthesizing a unidirectional voltage from the frequency generating signal output by said first multiplexor means and a minimum bias voltage capable of driving said reel motor;
   phase locked means for receiving and phase-locking the frequency generating signal from said first multiplexor means and generating a phase-locked output;
   comparator means for comparing the synthesized unidirectional voltage generated by said control means with a predetermined reference voltage, and outputting a first control signal or a second control signal;
   second multiplexor means for selecting the synthesized unidirectional voltage from said control means when the first control signal is output from said comparator means and for selecting the phase-locked output from said phase locked means when the second control signal is output from said comparator means; and
   motor driver means for receiving the output from said second multiplexor means and for driving the reel motor.

2. A circuit for controlling tape tension according to claim 1, wherein said control means comprises a monostable multivibrator generating a pulse dependent on the frequency generating signals of said first multiplexor means, a low pass filter converting the output of said monostable multivibrator into the unidirectional voltage, and a bias circuit generating the minimum bias voltage for driving the reel motor.

3. A circuit for controlling the tape tension according to claim 2, wherein the reference voltage of the comparator means is so set to a value larger than the minimum bias voltage.

4. A circuit for controlling tape tension, comprising:
   first multiplexing means for providing at a first node, a first frequency signal during a first mode and a second frequency signal during a second mode;
   control means for receiving said first and second frequency signals, and for generating a drive voltage to power a reel motor with said drive voltage exhibiting a minimum voltage capable of rotating the reel motor during an initial phase of one of said first and second modes;
   means for comparing said drive voltage with a reference voltage, and for providing a control signal having a first logic state when said drive voltage satisfies a first criterion relative to said reference voltage and a second logic state when said drive voltage satisfies a second criterion relative to said reference voltage;
   means for conducting said first and second frequency signals from said first node; and
   second multiplexing means applying said minimum voltage to rotate the reel motor during said first logic state and for applying one of said first and second frequency signals received via said conducting means to rotate said reel motor during said second logic state.

5. A circuit for controlling tape tension, comprising:
   first multiplexing means for providing at a first node, a first frequency signal during a first mode and a second frequency signal during a second mode;
   control means for receiving said first and second frequency signals, and for generating a drive voltage to power a reel motor with said drive voltage exhibiting a minimum voltage capable of rotating the reel motor during initial phases of said first and second modes;
   means for comparing said drive voltage with a reference voltage, and for providing a control signal having a first logic state when said drive voltage satisfies a first criterion relative to said reference voltage and a second logic state when said drive voltage satisfies a second criterion relative to said reference voltage;

means for conducting said first and second frequency signals from said first node; and second multiplexing means applying said minimum voltage to rotate the reel motor during said first logic state and for applying one of said first and second frequency signals received via said conducting means to rotate said reel motor during said second logic state.

6. The circuit of claim 5, wherein said control means comprises:

means for supplying said minimum voltage;

means for generating synthesized voltages in response to reception of said first or second frequency signals; and output means for adding and applying said minimum voltage and said synthesized voltages to said second multiplexing means as said drive voltage.

7. The circuit of claim 6, wherein said first multiplexing means provides during an initial search mode, said one of said first and second frequency signals with a voltage amplitude of approximately zero volts.

8. The circuit of claim 6, wherein said first multiplexing means provides during an initial search mode, one of said first and second frequency signals enabling said generating means to provide said synthesized voltages with an amplitude of approximately zero volts.

9. The circuit of claim 5, wherein said control means is further comprised of means for supplying a bias voltage with an amplitude approximately equal to said minimum voltage capable of driving said reel motor coupled to said second multiplexing means.

10. The circuit of claim 9, further comprises a generating means wherein said first multiplexing means provides during an initial search mode, one of said first and second frequency signals enabling said generating means to provide synthesized voltages with an amplitude of approximately zero volts.

11. The circuit of claim 5, wherein said conducting means comprises a phase locked loop for receiving, phase locking and transmitting to said second multiplexing means, said first and second frequency signals.

12. The circuit of claim 5, wherein said first multiplexing means includes means for maintaining said drive voltage, during an initial search phase, having an amplitude approximately equal to said minimum voltage.

13. The circuit of claim 5, wherein said first multiplexing means provides during an initial search phase, said one of said first and second frequency signals with a voltage amplitude of approximately zero volts, and a bias voltage with an amplitude approximately equal to said minimum voltage.

14. The circuit of claim 5, further comprised of a phase locked loop coupled to receive from said first multiplexing means, phase locking, and applying to said second multiplexing means, said one of said first and second frequency signals.

15. A circuit for controlling tape tension, comprising:

first multiplexing means for providing at a first node, a first frequency signal during a first mode and a second frequency signal during a second mode;

control means for receiving said first and second frequency signals, for generating a drive voltage to power a reel motor, and for limiting amplitude of said drive voltage during an initial phase of said first and second modes to a minimum voltage capable of rotating the reel motor;

means for comparing said drive voltage with a reference voltage, and for providing a control signal having a first logic state when said drive voltage satisfies a first criterion relative to said reference voltage and a second logic state when said drive voltage satisfies a second criterion relative to said reference voltage;

means for conducting said first and second frequency signals from said first node; and second multiplexing means applying said drive voltage to rotate the reel motor during said first logic state and for applying one of said first and second frequency signals received via said conducting means to rotate said reel motor during said second logic state.

16. The circuit of claim 15, wherein said control means comprises:

means for supplying said minimum voltage;

means for generating synthesized voltages in response to reception of said first or second frequency signals; and output means for adding and applying said minimum voltage and said synthesized voltages to said second multiplexing means as said drive voltage.

17. The circuit of claim 16, wherein said first multiplexing means provides during an initial search mode, one of said first and second frequency signals enabling said generating means to provide said synthesized voltages with amplitudes of approximately zero volts.

18. The circuit of claim 15, wherein said control means is further comprised of means for supplying a bias voltage with an amplitude approximately equal to said minimum voltage capable of driving said reel motor coupled to said second multiplexing means.

19. A reel motor control circuit, comprising:

selecting means connectable for receiving mode selection signals, for providing at a first node, independence towards upon said mode selection signals, a first frequency signal during a first mode and a second frequency signal during a second mode;

control means coupled to receive said first and second frequency signals, for generating a drive voltage to power a reel motor with said drive voltage exhibiting a minimum voltage capable of rotating said reel motor during an initial phase of said first mode;

means for conducting said first and second frequency signals from said first node;

means for comparing said drive voltage with a reference voltage, and for providing a control signal having a first logic state when said drive voltage satisfies a first criterion relative to said reference voltage and a second logic state when said drive voltage satisfies a second criterion relative to said reference voltage; and said selecting means coupled to receive said drive voltage, for, in dependence upon said control signal, providing as an output signal for operating said reel motor, one of said drive voltage or one of said first or second frequency signals.

20. The circuit of claim 19, wherein said selecting means providing during an initial search mode, one of said first and second frequency signals with a voltage amplitude of approximately zero volts.

21. The circuit of claim 19, wherein said conducting means comprises a phase locked loop coupled to receive, phase lock and apply to said selecting means, said first and second frequency signals.

22. The circuit of claim 19, wherein said control means comprises:
    means for supplying said minimum voltage;
    means for generating synthesized voltages in response to reception of said first or second frequency signals; and
    output means for adding and applying said minimum voltage and said synthesized voltages to said selecting means as said drive voltage.

23. The circuit of claim 19, wherein said selecting means provides during an initial search phase, one of said first or second frequency signals with a voltage amplitude of approximately zero volts, and said control means provides a bias voltage with an amplitude approximately equal to said minimum voltage capable of driving the reel motor.

* * * * *

UNITED STATES PATENT AND TRADEMARK OFFICE
CERTIFICATE OF CORRECTION

PATENT NO. : 4,996,466

DATED : Feb. 26, 1991

INVENTOR(S) : Hyun-Joon Su

It is certified that error appears in the above-identified patent and that said Letters Patent is hereby corrected as shown below:

Claim 19, Col. 6, Lines 39 and 40, change "independence towards upon" to --in dependence upon--.

Signed and Sealed this

Eleventh Day of August, 1992

*Attest:*

DOUGLAS B. COMER

*Attesting Officer*      *Acting Commissioner of Patents and Trademarks*